Oct. 25, 1966 S. W. SATTAVARA 3,280,557
SAFETY CONTROL CIRCUIT FOR POWER STEERING UNIT
Filed March 11, 1965 2 Sheets-Sheet 1
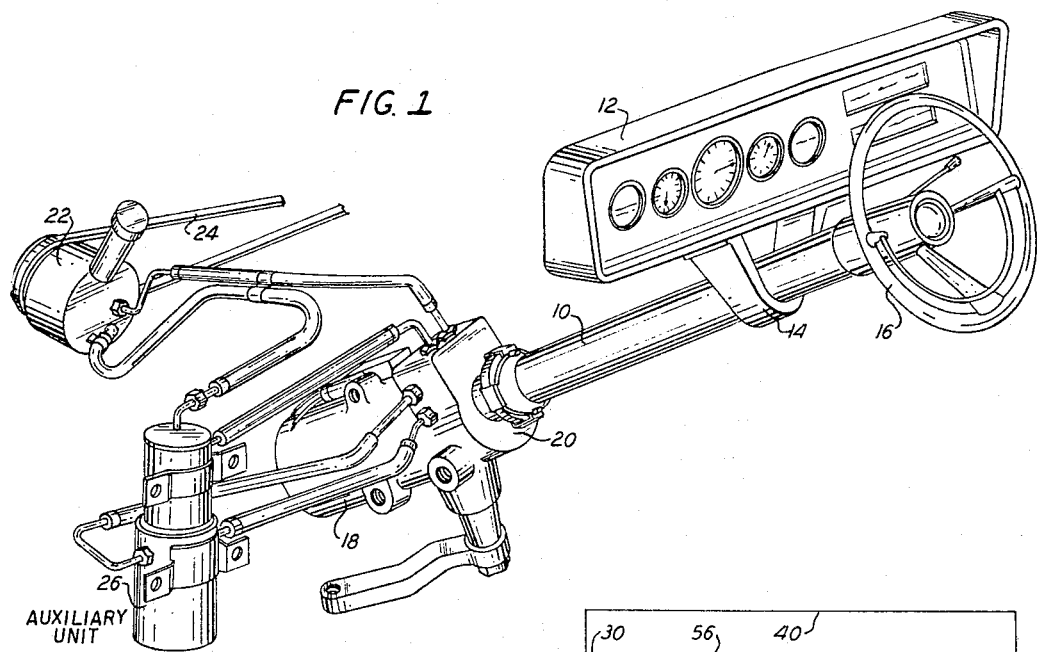
FIG. 1
FIG. 2
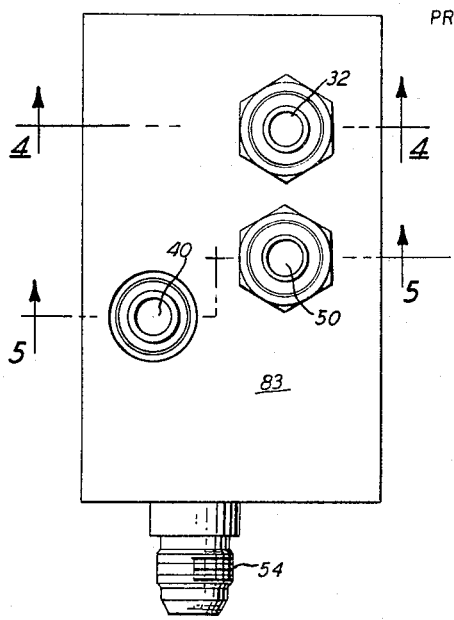
FIG. 3
SVEN W. SATTAVARA
INVENTOR
BY John R. Faulkner
Robert E. McCollum
ATTORNEYS Oct. 25, 1966 S. W. SATTAVARA 3,280,557
SAFETY CONTROL CIRCUIT FOR POWER STEERING UNIT
Filed March 11, 1965 2 Sheets-Sheet 2
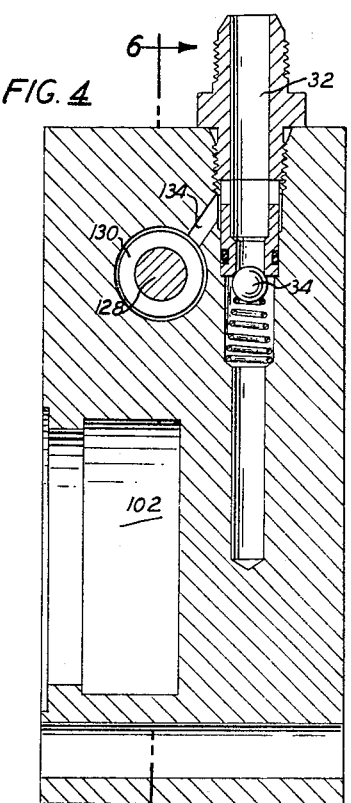
FIG. 4
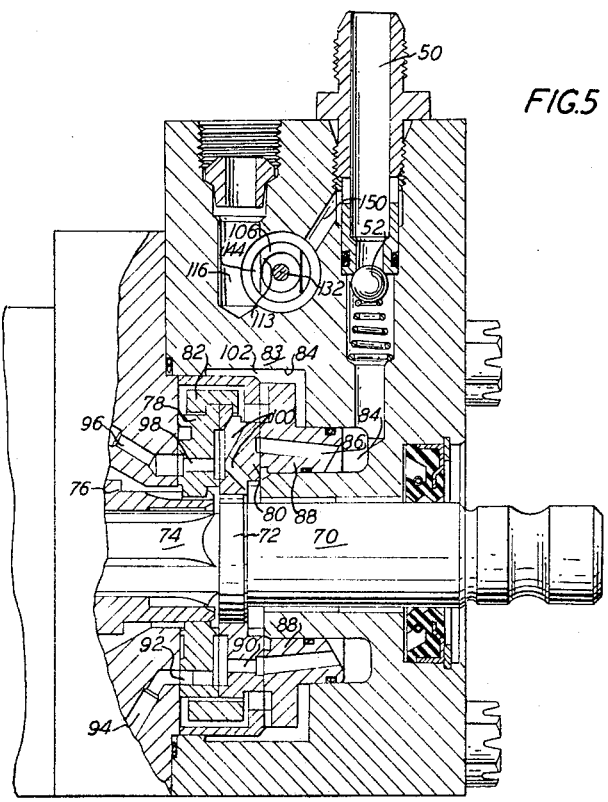
FIG. 5
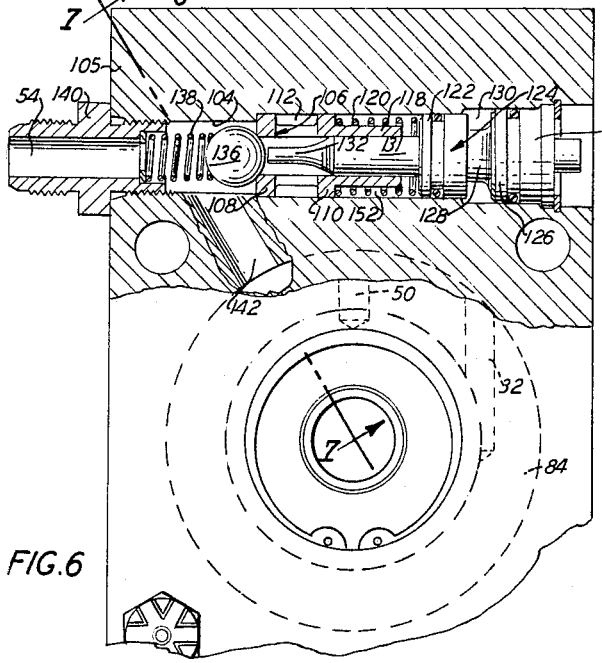
FIG. 6
FIG. 7
SVEN W. SATTAVARA
INVENTOR
John A. Faulkner
BY Robert E. McCollum
ATTORNEYS

United States Patent Office 3,280,557
Patented Oct. 25, 1966

3,280,557
SAFETY CONTROL CIRCUIT FOR POWER STEERING UNIT
Sven W. Sattavara, Detroit, Mich., assignor to The Ford Motor Company, Dearborn, Mich., a corporation of Delaware
Filed Mar. 11, 1965, Ser. No. 439,013
8 Claims. (Cl. 60—52)

This invention relates to a hydraulic control system. More particularly, it relates to a hydraulic control circuit for the power steering unit of a motor vehicle.

In the past, power steering was used primarily to reduce steering efforts. The over-all turning ratios were relatively high and substantially the same as that used with manual steering systems. The problem of power failure was not too objectionable, therefore, because the steering gear provided a manageable manual steering system. The more recently introduced power steering systems, however, use lower gear ratios to provide more effective and comfortable control of the vehicle. These reduced gear ratios, however, result in objectionable manual override efforts. Therefore, a failure in the main hydraulic power steering circuit usually renders it quite difficult to control the steering purely by manual means.

It is, therefore, a primary object of the invention to provide a motor vehicle hydraulic control system having an auxiliary hydraulic control means for use in the event of a failure in the main system to assure control of the vehicle at this time.

It is a further object of the invention to provide a hydraulic power steering control system with an auxiliary or emergency pump circuit that is automatically activated in the event of a failure in the main power steering pump circuit so that control of the motor vehicle steering is maintained.

A still further object of the invention is to provide a motor vehicle power steering hydraulic control circuit consisting of primary and auxiliary pump circuits each operable independently of the other and supplied with fluid from separate sumps; the auxiliary pump being inoperative as long as the main pump pressure head is above a predetermined value; the operation of the auxiliary pump being controlled by a pilot operated check valve in the return line of the main pump so that a drop in the head pressure of the main pump starts the auxiliary pump and reroutes the fluid flow through the auxiliary pump circuit until the main circuit is again operative.

Other objects, features and advantages of the invention will become apparent upon reference to the succeeding, detailed description thereof, and to the drawings illustrating the preferred embodiment thereof, wherein:

FIGURE 1 illustrates isometrically a portion of a motor vehicle in which the invention is embodied;

FIGURE 2 is a line diagram of a hydraulic control circuit for the invention;

FIGURE 3 is a top view of a portion of a power steering unit embodying the invention;

FIGURES 4 and 5 are cross-sectional views taken on planes indicated by and viewed in the direction of arrows 4—4 and 5—5 of FIGURE 3;

FIGURE 6 is a cross-sectional view taken on a plane indicated by and viewed in the direction of the arrows 6—6 of FIGURE 4; and FIGURE 7 is a cross-sectional view taken on a plane indicated by and viewed in the direction of the arrows 7—7 of FIGURE 6.

FIGURE 1 shows, in perspective, a portion of the steering control mechanism for a motor vehicle. It includes a steering column 10, one end of which is supported from a motor vehicle dashboard 12 by a hanger 14. The column 10 has a conventional steering wheel 16 on its upper end, and, at its lower end, engages a steering gear indicated generally at 18. In this case, 18 is a power steering unit. It includes an auxiliary or emergency power steering unit 20 that automatically takes over in the event of a failure in the main hydraulic circuit. The power steering unit is supplied with fluid from a main pump 22 driven from the engine by a belt 24. The auxiliary pump, electric motor, and fluid reservoir are contained in a housing 26.

FIGURE 2 shows schematically the hydraulic control system of the invention. It includes the main or primary hydraulic pump 22, which may be of the gear or any other suitable type. It has an inlet 28 connected to a sump 30, and a discharge line 32 connected through a one-way check valve 34 to the inlet 36 of power steering gear unit 18. The gear unit is of a known movable piston type integral with a worm moved upon displacement of the piston by fluid applied to one side or the other thereof in a known manner. The fluid displaced flows into an outlet 37 and through a pilot operated control valve 38 into a return line 40 connected to sump 30.

The system also includes a second or auxiliary pump supply circuit that includes a fluid pump 42. This pump also may be of the gear or any other suitable type. It has an inlet 44 connected to a sump 46 through a one-way check valve 48; a fluid pressure discharge line 50 connected through a one-way check valve 52 to the inlet 36 of power steering gear unit 18; and, a return line 54 connected to the outlet 37 of the power steering gear unit in parallel to return line 40.

Control valve 38 is a two-positional valve. That is, it is an on-off valve that is pilot operated by a differential in head pressures between primary supply pump 22 and auxiliary pump 42. More specifically, main pump discharge line 32 has a branch passage 56 connected to a servo 58 acting on one end of valve 38. Similarly, discharge line 50 from auxiliary pump 42 has a branch passage 60 leading to a servo 61 that aids a spring 62 biasing valve 38 to a position closing line 40.

Valve 38 is normally biased by spring 62 to a position blocking return line 40. As soon as the pressure in line 32 reaches a predetermined value, such as, for example, that which will provide a flow of two g.p.m., this pressure acting against servo 58 moves valve 38 to the position shown to permit a circulation of the primary pump fluid back to its sump 30 and inlet 28.

Auxiliary pump 42 is normally inoperative, and, therefore, any circulation of fluid through line 54 will be negligible due to the resistance of rotation of the auxiliary pump and the resistance to opening of one-way check valve 52. The auxiliary pump is adapted to be activated whenever the primary pump head pressure drops below the predetermined minimum. This is sensed by a pressure switch 64 connected to discharge line 32. That is, when the pressure in lines 32 and 56 drops low enough to permit spring 62 to position control valve 38 to block return line 40, pressure switch 64 will be activated to start auxiliary pump 42.

Auxiliary pump 42 may be driven by any suitable means, such as an electric motor, for example, or by a belt connection to the engine crankshaft or output shaft, as desired. Once the auxiliary pump is in operation, valve 38 is closed by the pressure in line 60, check valve 52 opens, and check valves 34 and 48 close. Line 40 is blocked, and the output from auxiliary pump 42 is forced to circulate through the power steering gear unit 18, and back into the inlet side of pump 42, thus maintaining sufficient power for controlling the steering of the motor vehicle.

When and if the failure in the main hydraulic circuit is overcome, and main supply pump 22 again begins to supply sufficient fluid, pressure switch 64 will move and shut off auxiliary pump 42; at the same time, the pressure acting on servo 58 will move valve 38 to the position shown to again supply the power steering gear unit from the main fluid circuit.

It will be clear, of course, that other suitable switch means could be used to activate the auxiliary pump 42 when the main pump fails or becomes inoperative, without departing from the scope of the invention. For example, a vacuum switch, controlled by engine intake manifold vacuum, could be used so that when the engine stalls, thereby ceasing the drive to main pump 22, the switch would close and start up pump 42. Or, the switch could be controlled by the engine generator or alternator, so that stalling of the engine would again close the switch and start auxiliary pump 42.

It will be clear from the above that the power steering gear is provided with fluid under pressure from the auxiliary pump circuit independently of the main pump circuit, each circuit having its own sump, and the auxiliary pump circuit only operating when the main pump circuit is inoperative.

FIGURES 3 through 7 show some of the specific details of construction of the main and auxiliary circuits for the power steering gear unit. FIGURE 5 shows a cross-sectional view of a portion of a conventional power steering unit including details of the hydraulic porting and passages. The figure shows a conventional steering input shaft 70 that is enclosed by the sleeve 10 of FIGURE 1. Shaft 70 is knurled at its upper end for attachement to the conventional steering wheel 10 for rotation of the shaft in opposite directions. The lower end of shaft 70 has an enlarged portion 72 and a reduced diameter stem portion 74, both of which are externally splined. Stem portion 74 is loosely splined within an annular sleeve 76 that is connected to a worm gear (not shown) forming part of a conventional steering gear mechanism. The loose connection permits a few degrees of relative rotation between shaft portion 74 and worm portion 76 so that when the power steering unit is operating, the manual turning of shaft 70 will not manually turn the worm. A turning of the worm, however, can be obtained manually if a power failure develops, after a slight angular rotation of shaft 70 with respect to steering worm sleeve 76.

The enlarged shaft portion 72 and the worm gear sleeve 76 are separately splined to relatively rotatable valve plates 78 and 80 of a known construction. These plates are in face-to-face relationship, and are provided with suitable interconnecting ports (not shown) so that when input shaft 70 is turned relative to sleeve 76, the valve plates will move to admit fluid under pressure to one or the other sides of a piston (not shown) integral with the worm to move it and the worm by fluid under pressure and thereby steer the vehicle.

Valve plates 78 and 80 are connected together in a yielding manner by a C-spring 82. The valve plates and C-spring are contained within a housing 83 that has an annular cavity 84. The cavity connects through a suitable bore 86 in a pressure member 88 to crossbores 90 and 92 in the face plates 78 and 80. These bores in turn are connected by a further bore 94 to the chamber on one side of the piston member. The opposite piston chamber is connected by a conduit 96 through other suitable passages 98 and 100 in valve plates 78 and 80 to the outer peripheral portion 102 of chamber 84 for return to the inlet 28 of primary pump 22.

Further details of the power steering unit are not given since they are known and are unnecessary for an understanding of the invention. The power steering unit as thus far described is substantially the same as that shown and described by David W. Barton et al. in U.S. patent application Serial No. 328,832, filed December 9, 1963, which is incorporated herein by reference.

Turning now to the invention, FIGURE 3 shows the housing 83 that encloses control valve 38, and shows the two pump discharge conduits 32 and 50, and the return lines 40 and 54. FIGURES 4 and 5 show the discharge passages from pumps 22 and 42 that include the ball check valves 34 and 52 that are spring biased against seats in the passages 32 and 50 to block off the supply when the pressure is below a predetermined level. This assures that the system will not drain through an inactive pump. FIGURE 6 shows the connection of both supply lines 32 and 50 to the annular inlet chamber 84. FIGURE 7 shows the connection of the fluid line connected to one side of the steering pump piston to the outer peripheral portion 102 and therefrom to the annular bore 104 defined in a valve body 105 formed as part of the power steering unit housing 83.

More specifically, as best seen in FIGURES 5 and 6, the bore 104 contains a stationary sleeve portion 106 having spaced lands 108 and 110 defining an annular chamber 112. The sleeve is formed with a flat 113 (FIGURE 5) on opposite sides so that fluid entering the end portion of the sleeve flows axially and then at right angles through the side opening caused by the flat into the return line 116 connected to line 40 of main supply pump 22.

Sleeve 106 has a stem portion 118 that acts as a guide for a spring 120 seated between land 110 and a land 122 formed on a ball check valve actuator 124. This latter member is spaced from a land 126 on a stationary plug 127 by a stem portion 128 of reduced diameter to form a fluid chamber 130. Actuator 124 has a stem 131 with a conical tip 132 that is slidable within the bore of sleeve 106 against the force of spring 120.

As best seen in FIGURE 4, fluid under pressure from main pump discharge passage 32 can flow through a branch passage 134 into the annular space 130 between lands 122 and 126 and act against the effective area of land 122. This results in a net force acting to move actuator 124 to the left against the force of spring 120 to unseat a ball check valve member 136 that normally closes off the one end of the bore of sleeve 106. The ball is biased to a seated position by a spring 138 to close the bore. The spring is seated in the bore of a plug 140 that is connected to the return line 54 for the auxiliary pump supply circuit.

In operation, once the motor vehicle engine is started and primary pump 22 is driven, fluid under pressure is discharged through line 32 (FIGURE 4) to enter annular chamber 130 between land 122 of the check valve actuator 124 and land 126 of plug 127 (FIGURE 6). This moves the valve to unseat ball check valve 136 and permit circulation of fluid from chamber 102 (FIGURES 5 and 7) of the power steering unit through a line 142 into the open end of sleeve 106 and through the lateral bore 144 (FIGURE 5) to return line 40 (FIGURE 5). Simultaneously, fluid supplied through line 32 passes into annular chamber 84 (FIGURES 5 and 6).

If the vehicle is traveling forward in a straight line, or if the steering wheel is not being rotated, plate valves 78 and 80 do not rotate relative to each other, and the system merely circulates fluid through the inlet 90 and out return line 142, and no load is placed upon supply pump 22. If a turn is to be made, input shaft 70 is rotated, setting up a relative rotation between the plate valves 78 and 80 to restrict the supply of fluid to one or the other of the conduits 90 or 92 in a known manner. This builds up a resistance to flow through one of the lines, thus increasing the pressure in the opposite line and causing the power steering unit piston to be moved one way or the other to cause the front wheels of the vehicle to turn. At this time, all of the flow from the power steering gear unit will pass through the primary pump return line 40.

If a failure should now occur in the main supply circuit, the pressure in discharge line 32 would drop to a point below that required to circulate the desired flow to the steering gear and related hoses. This drop in head pressure is reflected in annular chamber 130 between land 122 of check valve actuator 124 and land 126 of plug 127, and permits spring 120 to move the valve to the right to seat ball check valve 136 in the bore of sleeve 106. Simultaneously, the drop in pressure actuates pressure switch 64 (FIGURE 2) to activate auxiliary pump 42. At this time, therefore, the primary pump return line 40 is closed by seating of the ball valve 136, and all of the return from the fluid circuit will pass through the secondary pump return line 54. The secondary or auxiliary pump 42, therefore, supplies fluid under pressure through line 50 to annular chamber 84 of the power steering gear unit; that is, it supplies the necessary requirements for operation of the power steering unit at this time. Simultaneously, as best seen in FIGURE 5, fluid is supplied through a passage 150 to the chamber 152 between land 110 of sleeve 106 and land 122 of the check valve actuator 124, thereby moving the check valve actuator to the right as far as possible and out of engagement with the ball valve 136. This assures that the primary pump return line 40 will be closed and the secondary pump return line 54 open.

The operation of the power steering unit by means of the auxiliary pump circuit continues until such time as the failure of the main circuit has been corrected and the main pump pressure again begins to build up. When this occurs, the auxiliary pump 42 will cut off by opening of pressure switch 64, the pressure in annular chamber 152 between lands 110 and 122 will decay, and the main pump pressure in annular chamber 130 will build up to a value sufficient to move actuator 124 to the left to unseat ball valve 136 and again permit return flow from the power steering unit through the primary return line 40.

From the foregoing, it will be seen that the invention provides an auxiliary pump circuit for operation of a power steering unit in the event of failure of the main hydraulic circuit. It will also be seen that the auxiliary circuit is controlled in a simple manner by a single pilot operated check valve responsive to the pressure differential between the main and auxiliary pump supply lines and a simple pressure switch for activating the normally inoperative auxiliary pump. It will also be seen that each of the circuits has its own sump and operates only when the other is not operating.

While the invention has been illustrated in its preferred embodiment in the figures, it will be clear to those skilled in the arts to which the invention pertains that many changes and modifications may be made thereto without departing from the scope of the invention.

I claim:

1. A dual fluid supply circuit for a fluid recirculating mechanism having a fluid inlet and outlet, comprising, a main normally driven fluid supply pump and an auxiliary normally at rest fluid supply pump each having a fluid discharge and return line, means connecting the discharge lines in parallel to said inlet and return lines in parallel to the outlet of said mechanism, first control means in said lines blocking the flow of fluid between said pumps, additional control means in one of said return lines differentially operated by the discharge pressure from both of said pumps thereagainst to permit or block flow through said one line as a function of the operability and discharge pressure of said pumps, and means responsive to a predetermined operation of said main pump to activate said auxiliary pump.

2. A dual fluid supply circuit for a fluid recirculating mechanism having a fluid inlet and outlet, comprising, a main normally driven fluid supply pump and an auxiliary normally at rest fluid supply pump each having a fluid discharge and return line, means connecting the discharge lines in parallel to said inlet and return lines in parallel to the outlet of said mechanism, first control means in said lines blocking the flow of fluid between said pumps, additional control means in one of said return lines differentially operated by the discharge pressure from both of said pumps thereagainst to permit or block flow through said one line as a function of the operability and discharge pressure of said pumps, and means responsive to a predetermined operation of said main pump to activate said auxiliary pump, said last mentioned means comprising pressure sensitive means in the discharge line of said main pump and operably connected to said auxiliary pump for automatically activating said auxiliary pump in response to a predetermined decay in pressure in said main pump discharge line.

3. A supply circuit as in claim 1, said first control means including a plurality of one-way check valves.

4. A supply circuit as in claim 1, said additional means comprising a movable control valve controlling the main pump return line, means connecting the fluid from both of said pumps to different portions of said valve in opposition to each other to control the movement of said valve, and means biasing said valve to a position closing said main pump return line.

5. A control system as in claim 1, wherein said control means comprises a ball check valve spring biased to a position closing said return line, and a spool valve portion movable in a valve body against said check valve by the primary pump fluid pressure acting thereagainst to unseat said valve and move it to a position permitting flow through said return line, said spool valve portion being movable away from said check valve by auxiliary pump fluid pressure to block said primary pump return line.

6. A supply circuit as in claim 2, said additional means comprising a movable control valve controlling the main pump return line, means connecting the fluid from both of said pumps to different portions of said valve in opposition to each other to control the movement of said valve, and means biasing said valve to a position closing said main pump return line, said control valve and pressure sensitive means moving concurrently and automatically upon the predetermined decay in pressure in said main pump discharge line to activate said auxiliary pump and close said main pump return line.

7. A power steering fluid supply circuit for a power steering gear mechanism having a fluid inlet and outlet, comprising, a main normally driven fluid supply pump and an auxiliary normally at rest fluid supply pump each having a fluid discharge and return line, means connecting the discharge lines in parallel to said inlet and return lines in parallel to the outlet of said mechanism, one-way check valve means in said lines blocking the flow of fluid between said pumps, additional control means associated with said return lines differentially operated by the discharge pressure from both of said pumps to permit or block flow through said return lines as a function of the operability and discharge pressure of said pumps, and means associated with the said main pump and operably connected to said auxiliary pump for automatically activating said auxiliary pump in response to a predetermined decay in pressure in said main pump discharge line, said additional control means comprising second valve means automatically operable to proportion the flow of fluid from said outlet to said return lines, said latter valve means comprising a valve disposed in said return lines to be movable variably between positions closing the main pump return line to said outlet while opening said auxiliary pump return line to said outlet, and vice versa, means biasing said valve to close said main pump return line, and means movable by fluid under pressure applied thereto from said main and auxiliary pumps for controlling the movements of said valve.

8. A supply circuit as in claim 7, said last mentioned means comprising a valve actuator movable against said valve to move it to open said main pump return line, and means connecting the fluid under pressure from said pumps to different portions of said actuator to act in opposition to each other and control the movement of said actuator by the differential in pressure therebetween.

References Cited by the Examiner

UNITED STATES PATENTS

| 1,955,922 | 4/1934 | Lamond | 60—52 |
| 2,323,519 | 7/1943 | Dean | 60—60 X |
| 2,674,854 | 4/1954 | Church | 60—102 |

FOREIGN PATENTS 1,157,945  11/1963  Germany.

EDGAR W. GEOGHEGAN, *Primary Examiner.*